(12) United States Patent
Valliere et al.

(10) Patent No.: US 10,315,845 B2
(45) Date of Patent: Jun. 11, 2019

(54) RACK COMPONENT AND RACK SYSTEM

(71) Applicant: Vurn Innovation, LLC, Jupiter, FL (US)

(72) Inventors: Marc Denis Valliere, Jupiter, FL (US); Matthew David Burns, Palm Beach, FL (US)

(73) Assignee: Vurn Innovation, LLC, Jupiter, FL (US)

( * ) Notice: Subject to any disclaimer, the term of this patent is extended or adjusted under 35 U.S.C. 154(b) by 142 days.

(21) Appl. No.: 15/451,947

(22) Filed: Mar. 7, 2017

(65) Prior Publication Data

US 2017/0231382 A1 Aug. 17, 2017

Related U.S. Application Data

(63) Continuation-in-part of application No. 15/381,392, filed on Dec. 16, 2016, now Pat. No. 10,202,241, which is a continuation-in-part of application No. 14/957,368, filed on Dec. 2, 2015, now Pat. No. 9,930,960.

(60) Provisional application No. 62/086,738, filed on Dec. 3, 2014.

(51) Int. Cl.
*A47B 47/04* (2006.01)
*B65G 1/14* (2006.01)

(52) U.S. Cl.
CPC .............. *B65G 1/14* (2013.01); *A47B 47/047* (2013.01)

(58) Field of Classification Search
CPC ....... B65G 1/14; A47B 47/0091; A47B 47/02; A47B 47/04; A47B 45/00

USPC ................................ 211/41.15, 183; D25/68
See application file for complete search history.

(56) References Cited

U.S. PATENT DOCUMENTS

| | | | | | |
|---|---|---|---|---|---|
| 342,187 | A | * | 5/1886 | Cornell | B25B 11/00 269/133 |
| 611,340 | A | * | 9/1898 | Smith | B25B 11/00 269/133 |
| 1,606,634 | A | * | 11/1926 | Hinds | E04F 21/0023 269/102 |
| 1,715,722 | A | * | 6/1929 | Smith | B25B 5/00 248/166 |
| 2,487,742 | A | * | 11/1949 | Sutter | B25B 1/103 269/133 |
| 2,558,404 | A | * | 6/1951 | Watson | B25B 5/16 269/17 |
| 2,583,256 | A | * | 1/1952 | Dodson | E04F 21/0023 144/307 |
| 2,594,249 | A | * | 4/1952 | Tims | B25B 5/10 269/240 |
| 2,621,687 | A | * | 12/1952 | Fordon | B25B 5/06 269/133 |

(Continued)

*Primary Examiner* — Stanton L Krycinski
(74) *Attorney, Agent, or Firm* — Florek & Endres PLLC

(57) ABSTRACT

A rack component having a component body with a front, back, top, base, width between the front and the back, and an aperture extending through the component body near the top, the top of the component body configured to be the negative of a cut-out on the base, such that the cut-out on the base of one component body can receive the configuration on the top of an adjacent component body below it. Rack systems and methods of using a series of the rack components are also disclosed, including systems and methods including a bracket used with a pair of component bodies for rotating a workpiece.

21 Claims, 15 Drawing Sheets

(56) References Cited

U.S. PATENT DOCUMENTS

| | | | | |
|---|---|---|---|---|
| 2,763,302 A * | 9/1956 | English | B25B 11/00 248/149 |
| 2,774,622 A * | 12/1956 | Priebe | E05C 17/54 269/133 |
| 2,814,321 A * | 11/1957 | Haack | B25B 11/00 269/203 |
| 2,830,632 A * | 4/1958 | La Rouche | B25B 11/00 269/133 |
| 2,888,053 A * | 5/1959 | Nelson | B25B 11/00 248/121 |
| 3,374,917 A * | 3/1968 | Troy | A63H 33/08 206/504 |
| 3,554,384 A * | 1/1971 | DeNatale | A47B 87/0276 211/194 |
| 3,861,662 A * | 1/1975 | Morse | B25H 1/00 269/152 |
| 4,141,192 A * | 2/1979 | Augustine | E04F 21/0023 269/904 |
| 4,168,827 A * | 9/1979 | Hutchinson | B25B 5/04 269/238 |
| 4,491,308 A * | 1/1985 | Walton | B23Q 3/10 269/296 |
| D297,502 S * | 9/1988 | Archambeau | D8/71 |
| 5,048,806 A * | 9/1991 | Deutsch | E04F 21/0023 269/152 |
| 5,072,901 A * | 12/1991 | Scott | F16L 1/06 248/49 |
| 5,085,397 A * | 2/1992 | Henkel | F16M 11/10 182/178.1 |
| 5,178,279 A * | 1/1993 | Carroll | B65D 5/5088 206/335 |
| 5,294,099 A * | 3/1994 | Dalfino | B25B 11/00 269/133 |
| 5,729,949 A * | 3/1998 | Hartzheim | E04C 5/206 211/59.2 |
| 5,915,570 A * | 6/1999 | Orsini | A47B 45/00 211/198 |
| 5,931,320 A * | 8/1999 | Gajda | A47B 81/00 211/1.3 |
| 6,024,351 A * | 2/2000 | Metoyer | B25B 11/00 269/133 |
| 6,076,780 A * | 6/2000 | Honnecke | F16L 3/133 248/59 |
| 6,086,172 A * | 7/2000 | Lee | A47B 47/0075 108/101 |
| 6,090,204 A * | 7/2000 | Speed | B05B 13/0285 118/500 |
| 6,520,456 B1 * | 2/2003 | Neider | F16L 3/01 248/49 |
| 6,561,470 B1 * | 5/2003 | Gottfredson | B05B 13/0228 248/130 |
| 6,641,668 B1 * | 11/2003 | Edgerton | B05B 13/0285 118/500 |
| 6,729,089 B1 * | 5/2004 | Spragg | E04H 12/2238 248/346.03 |
| 6,925,771 B2 * | 8/2005 | Lee | E04C 5/08 52/685 |
| 7,007,978 B1 * | 3/2006 | Purdom | A63C 19/00 248/49 |
| D521,851 S * | 5/2006 | Smart | D8/354 |
| 7,077,365 B2 * | 7/2006 | Vincak | B05B 13/0285 248/122.1 |
| 7,278,613 B2 * | 10/2007 | Roy | F16L 3/02 248/49 |
| D555,467 S * | 11/2007 | Pecoraro | D8/380 |
| 7,441,731 B2 * | 10/2008 | Smart | F16L 3/02 248/68.1 |
| D585,728 S * | 2/2009 | Bertoni | D8/358 |
| 7,726,003 B1 * | 6/2010 | Rocha | B05B 13/0285 29/559 |
| 7,870,834 B1 * | 1/2011 | Cundiff | B05B 13/0285 118/500 |
| 7,946,562 B2 * | 5/2011 | Ignatoff | B25H 1/06 269/139 |
| 8,066,267 B2 * | 11/2011 | Schaerer | F26B 25/18 248/130 |
| 8,104,753 B2 * | 1/2012 | Crampton | B25B 11/00 269/133 |
| 8,347,811 B2 * | 1/2013 | Bucci | B25B 11/00 118/500 |
| 8,371,456 B2 * | 2/2013 | Scadden | F26B 25/185 211/59.4 |
| D692,393 S * | 10/2013 | Hillman | D13/102 |
| 8,757,604 B2 * | 6/2014 | Crampton | F16M 11/22 269/133 |
| 8,807,492 B2 * | 8/2014 | Lake | F16L 3/222 248/65 |
| 9,302,288 B2 * | 4/2016 | Waterston | B05B 13/0285 |
| 9,638,224 B1 * | 5/2017 | Westfall, II | F16B 2/10 |
| 2003/0089829 A1 * | 5/2003 | Brandzel | F16L 3/222 248/68.1 |

\* cited by examiner

RACK COMPONENT AND RACK SYSTEM

FIELD OF THE INVENTION

The present invention relates to a rack component and, more particularly, to a rack component that can be used with similar rack components for stacking doors, moldings and related materials during the finishing process.

BACKGROUND OF THE INVENTION

Workers finishing building workpieces such as doors, trim, moldings and the like during building or renovations, including painting, staining, sealing, or the like, often experience difficulties due to the awkward shapes and need to finish more than one side of the piece or pieces. For example, when finishing a door, a worker generally needs to paint a first side, wait for that side to dry and then finish the other side. Moreover, because of the size of most doors, finishing multiple doors often requires significant space to lay the doors down with the finish side up so that the finish side does not come in contact with other pieces, tools, brushes, drop cloths, etc., during the drying process.

Devices used to finish and stack workpieces have been primarily limited to saw horses, work benches, boards and the like, which are themselves not only space consuming when in use, but also space consuming when not in use and need to be stored.

Efforts to permit drying in smaller spaces generally include trying to place workpieces such as doors on an edge and stacking subsequent doors horizontally. However, this still requires that the edges be unfinished, and can lead to imperfections in the finish where a piece rests against an adjacent piece. Similarly, when drying trim or moldings, it is usual to finish a piece and then line it up with similarly finished pieces on a flat surface such as a floor or leaning against a wall to maximize space when drying. However, this quickly leads to the use of all available floor or wall space, leaving the worker without sufficient room.

Therefore, there is a failure in the art to provide a solution for permitting a user to finish doors, trim, molding and other pieces quickly and efficiently, and minimizing the space needed to dry multiple pieces as they are finished.

SUMMARY OF THE INVENTION

The present invention is directed to a rack component and rack system comprising a component body having a front, a back, a top, a base, a width between the front and the back, and an aperture near the top extending through the component body, wherein the top of the component body comprises a configuration that is the negative of a configuration cut-out on the base of the component body, such that the configuration cut-out on the base of one component body can receive the configuration on the top of an adjacent component body.

In the most preferred embodiment, the component body is generally in the shape of triangle with first and second sides of substantially equal length converging upwardly to an upper angle, a third side of an equal or different length than the first and second sides, the third side having a cut-out corresponding substantially to the upper angle, where the aperture is within the upper angle and extends through the component body.

The aperture is preferably in the shape of a circle for receiving a fastener such as a nail, screw or the like that passes through the aperture and can be affixed to the edge of a workpiece. Most preferably, the diameter of the aperture in the component body is preferably larger than the diameter of the fastener used with the component body, so that the component body can move freely about the fastener.

When finishing a door the worker preferably attaches two rack components to the top and bottom edges of a door, with at least two rack components on one of the top and bottom edges of the door and at least one rack component on the other of the top and bottom edges of the door. This permits the door to be suspended above a support surface, supported by the rack components fastened to the top and bottom edges of the door. When one side of the door is finished, workers can grasp the rack components at one side of each of the top and bottom, lifting the rack component(s) off of the support surface while maintaining the other of the rack components standing on the support surface. The door can then pivot on the fastener through the aperture on the standing rack component, flipping the door so that the second side is facing upwardly and the previously finished, but not yet dry side is facing downwardly. In doing so, the rack components both pivot around the fastener through the apertures so that the bottom or third sides of the rack components are maintained as the base to support the door.

The cut-out on the bottom of the component body is shaped substantially the same as the configuration of the top of the component body. In the triangle shape of the preferred embodiment, the upper angle is received in a cut-out on the bottom of the component body for receiving the upper angle of a rack component placed beneath. This allows rack components affixed to multiple workpieces to be stacked upon one another for finishing multiple workpieces.

For example, when finishing multiple doors, each of the doors would have rack components on the top and bottom edges at substantially the same points along the length of the top and bottom edges of the doors. When both sides of a subsequent door has been finished, the subsequent door can be lifted by the rack components, so as not to touch the newly finished door, and stacked on the rack components fastened to the previously finished door. This permits the finished doors to be stacked vertically in a minimal amount of space for drying until all are completely dried.

The width of the rack component is preferably sufficient to permit the rack components to stand and provide sufficient integrity to support the workpiece and to ensure a good support surface when adjacent rack components are stacked. Not only should the width be sufficient to support a heavy object such as a door, it should be sufficient to maintain the rack components in an upright position when supporting lighter loads such as trim or moldings.

For example, the rack components can be used with a span, such as a board, between opposed rack components to form a "bridge." When two or more of such bridges are placed at a sufficient distance from one another, trim, moldings, and the like can be finished and placed on the span in rows for drying. Moreover, multiple bridges of pairs of rack components with spans therebetween can be formed and stacked upon one another so that layers of workpieces can dry simultaneously.

In a preferred embodiment, the first and second sides of the component body may further include supports at a lower portion of the sides for receiving workpieces to dry. More specifically, supports may extend at an angle substantially perpendicular to or extending upwardly from the first and second sides to provide a rest against which a piece of trim, molding or the like may be supported. In the preferred embodiment, the extension of the supports and the length of the first and second sides is sufficient to hold a 6" wide piece of trim, molding or the like while also supporting a door, making multiple uses of the component body.

In a preferred embodiment, at least one of the front and the back of the component body further comprises one or more vertically oriented recessed areas corresponding to the width of a door for holding a door in a vertical orientation. Most preferably, the front of the component body includes a first recessed area having a wider width for holding a standard exterior door and a second recessed area having a narrower width for holding a standard interior door, where each of the first and second recessed areas are centered on the front and/or back of the rack component.

Although the component body can be solid across its width, it may be formed in an I-beam construction, with the edges having the full width and the middle having a reduced thickness to conserve material. Notwithstanding, it is preferred that an area surrounding the aperture extend to at least the width of one side of the component body, and preferably extend beyond the width of the component body to minimize contact with the door when the door and component body are being pivoted about the fastener. It is most preferred that the opposed side of the aperture be recessed from the width, and preferably recessed a sufficient distance so that the recess can retain and support a dowel spanning two rack components, for hanging workpieces if desired.

In a preferred embodiment, a bracket is attached to a pair of component bodies, enabling a user to flip and paint workpieces including cabinet doors, trims, and mortises. The bracket is preferably comprised of metal and has an "L-shaped" geometry. It is also preferred that the bracket comprises fastening elements, so it can be affixed to the rack components and the relevant workpiece.

The component body may be made of any suitable material that can provide structural integrity to the workpiece or stacked workpieces being supported, including wood, metal, plastic or the like, as well as combinations thereof. Most preferably, the component body is formed of an integrally formed plastic material by injection molding, to reduce the costs.

BRIEF DESCRIPTION OF THE DRAWINGS

The attached drawings, in which like reference characters represent like parts, are intended to better illustrate a preferred embodiment of the present invention without limiting the invention in any manner whatsoever.

DETAILED DESCRIPTION OF THE PREFERRED EMBODIMENT

Figure 1:
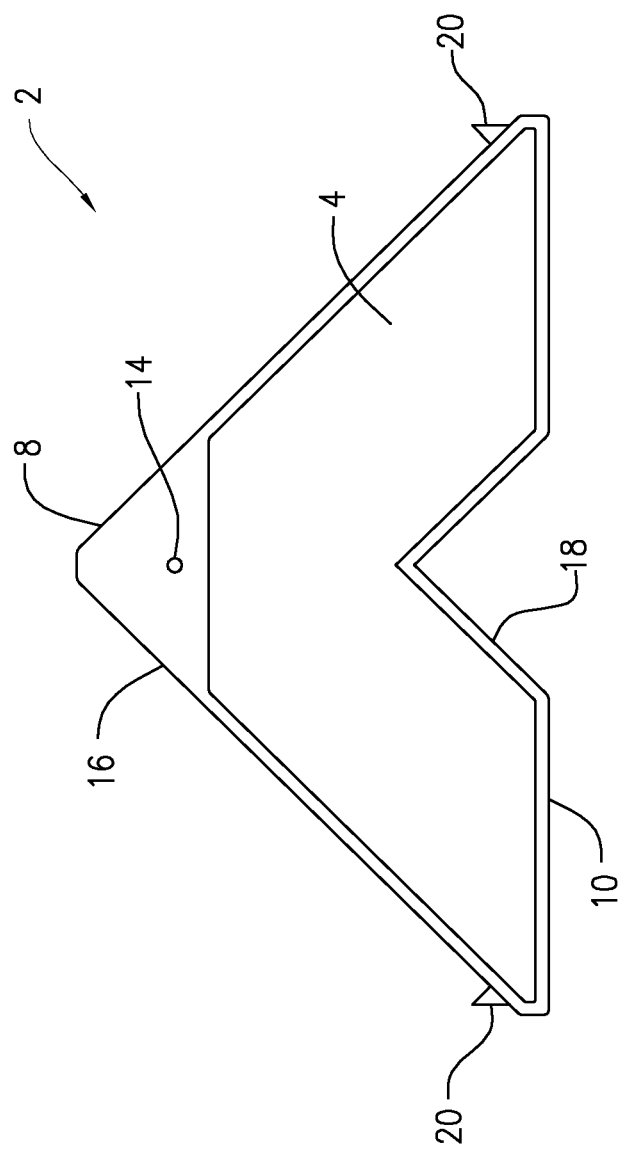
FIG. 1 is a front elevation of an embodiment of the present invention.

The following description of the preferred embodiment is presented to describe the present invention without limiting the scope of the appended claims in any manner whatsoever.

As shown in FIGS. 1-5, the present claimed invention is directed to a rack component, used as part of a rack system, where the rack component comprises a component body 2 having a front 4, a back 6, a top 8, a base 10, a width 12 between the front 4 and the back 6, and an aperture 14 near the top extending through the component body 2, wherein the top 8 of the component body comprises a top configuration 16 that is the negative of a bottom configuration 18 on the base 10 of the component body 2, such that the bottom configuration 18 on the base 10 of one component body 2 can receive the top configuration 16 on the top 8 of an adjacent component body 2.

In the most preferred embodiment, the component body 2 is generally in the shape of triangle with first and second sides of substantially equal length converging upwardly to an upper angle at the top 8, a third side of an equal or different length than the first and second sides forming the base 10, the third side having a cut-out configuration 18 corresponding substantially to the configuration 16 of the upper angle at the top 8, where the aperture 14 is within the upper angle and extends through the component body 2.

The aperture 14 can be any shape but is preferably a circular cylinder for receiving a fastener such as a nail, screw or the like, that passes through the aperture and can be affixed to the edge of a workpiece. In the preferred system, the fastener is a screw to provide ease of attachment and removal from the workpiece. Most preferably, the diameter of the aperture 14 in the component body 2 is somewhat larger than the diameter of the fastener passing through the aperture 14, so that the component body 2 can rotate about the fastener.

When finishing a door the worker preferably attaches two rack components 2 to the top and bottom edges of the door. Although the components 2 can be arranged with at least two rack components 2 on one of the top and bottom edges of the door and at least one rack component 2 on the other of the top and bottom edges of the door, it is preferred that four rack components 2 be used, with two components 2 fastened to the top edge and two components 2 fastened to the bottom edge of the door. Once the rack components 2 are attached, the door can be placed horizontally and easily finished and flipped to finish the opposite side.

The cut-out bottom configuration 18 on the base 10 of the component 2 is shaped substantially the same as the configuration 16 of the top 8 of the component 2 so that the bottom configuration 18 of one component 2 securely nests on the configuration 16 at the top 8 of a component 2 below it. In the triangle shape of the preferred embodiment, the upper angle top configuration 16 is received in a triangular cut-out bottom configuration 18 on the base 10 of the component body 2 for receiving the upper angle of a rack component placed beneath.

The width 12 of the rack component 2 is preferably sufficient to permit the rack components 2 to stand and provide sufficient integrity to support the workpiece and to ensure a positive engagement surface when adjacent rack components 2 are stacked. Not only should the width 12 be sufficient to support a heavy object such as a door, it should be sufficient to maintain the rack components 2 in an upright position when supporting lighter loads such as trim or moldings.

Figure 2:
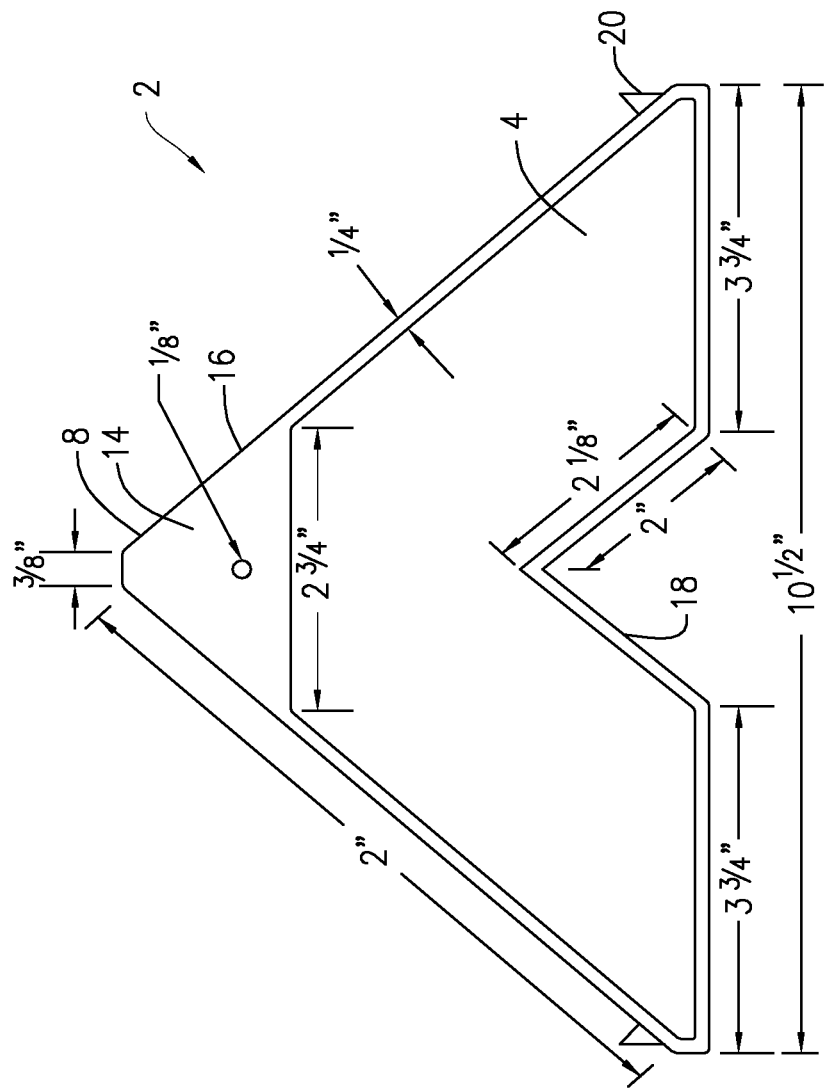
FIG. 2 is a front elevation of the embodiment of FIG. 1 with preferred dimensions illustrated.
Figure 3:
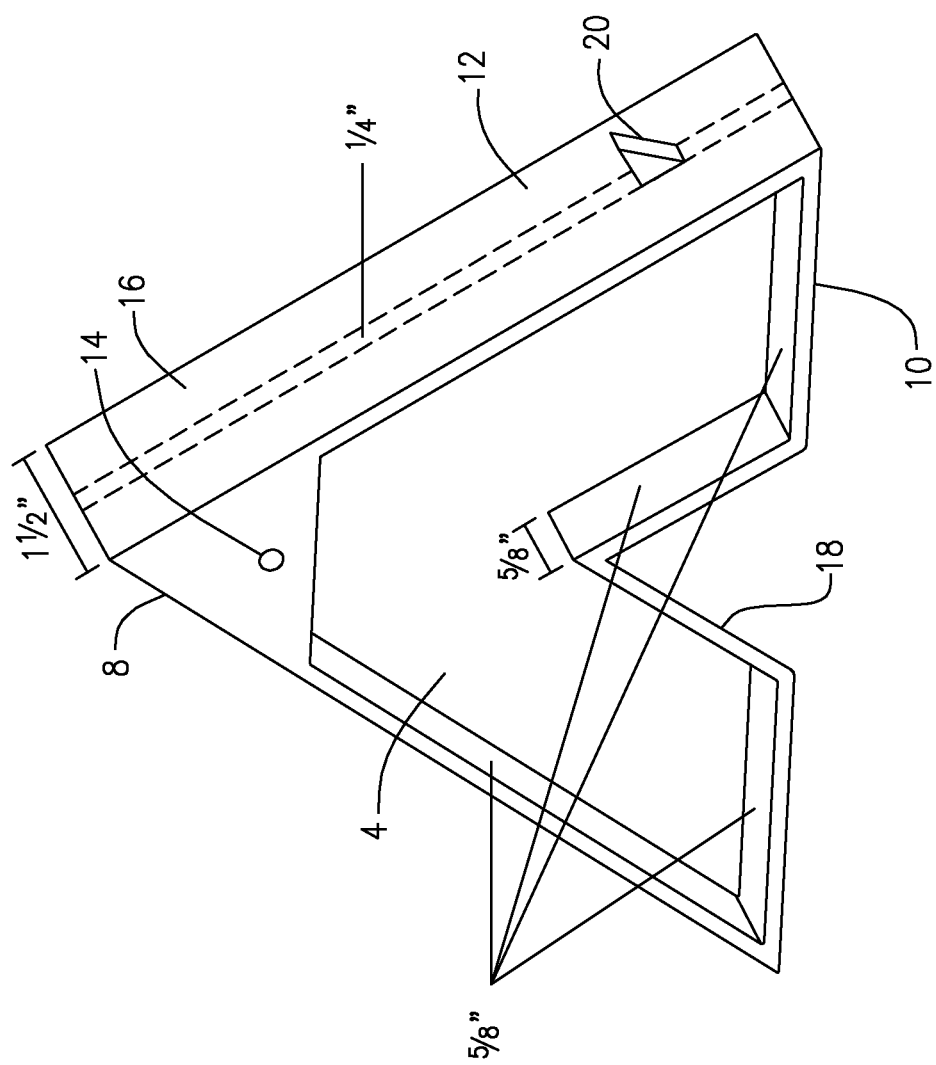
FIG. 3 is a front perspective view of the embodiment of FIG. 1 with preferred dimensions illustrated.
Figure 4:
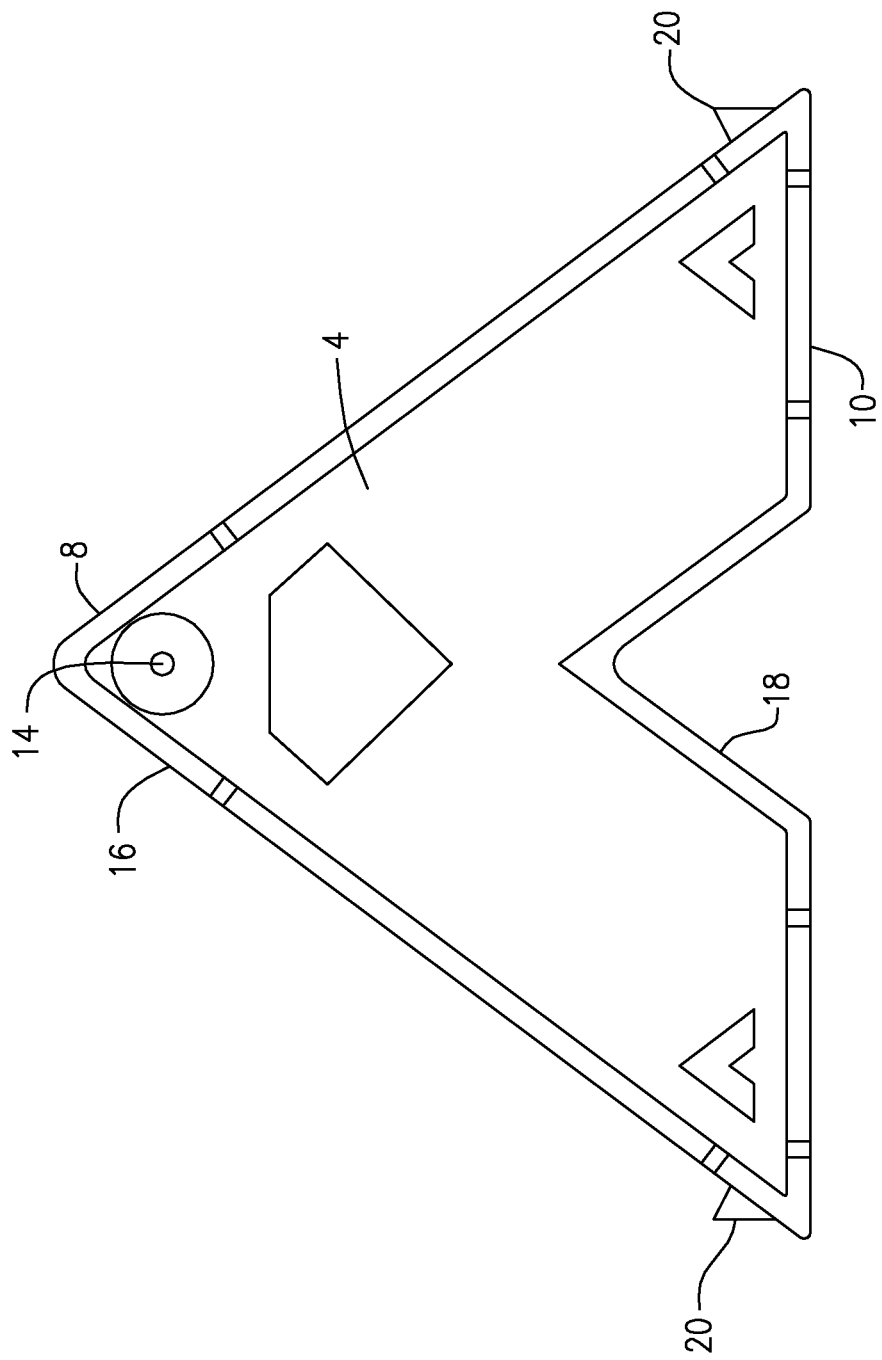
FIG. 4 is a front elevation of an alternative embodiment of the present invention.
Figure 5:
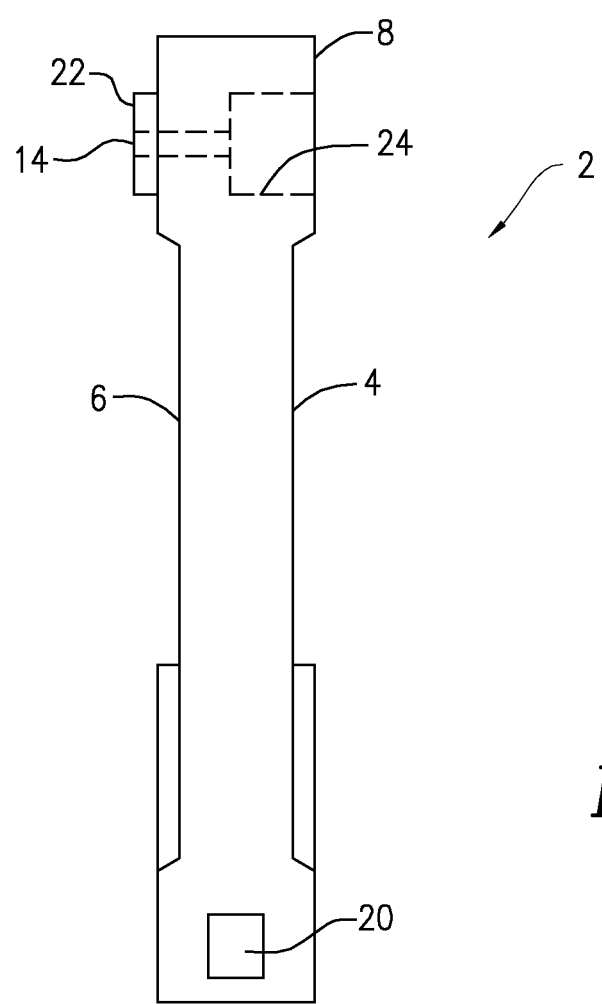
FIG. 5 is a side elevation of the alternative embodiment of FIG. 4.

Although the dimensions of the rack component 2 can be any dimensions suitable to support and stack workpieces, a triangular rack component 2 having upwardly facing converging sides of about 9 inches each and a base of about 10 inches across with a width of about 1½ inches is believed to be suitable (see FIGS. 2 and 3). The component 2 with these dimensions would preferably have a cut-out bottom configuration 18 with side walls of about 2 inches each and an angle that matches the configuration 16 at the top 8 of the component 2. Additionally, the aperture 14 would preferably be about ⅛ to ¼ inch in diameter for the fastener to freely pass through.

Of course, side dimensions of about 4 to 18 inches, bases of about 5 to 24 inches and widths of about ½ to 12 inches could be used for the embodiment shown, with an aperture of about 1/16 to 1 inch and a bump-out and recess of about ½ to 3 inches, without limitation.

In the preferred embodiment shown in the drawings attached hereto, the outer side walls of the component body 2 include supports 20 near the base 10 for supporting workpieces. More specifically, supports 20 may extend at an angle substantially perpendicular to or extending upwardly from the sides to provide a rest against which a piece of trim, molding or the like may be supported.

The preferred embodiment of the component body 2 shown is formed in an I-beam construction, with the edges having the full width 12 and the middle having a reduced thickness to conserve material. Although any suitable thicknesses can be used, the preferred embodiment shown contemplates the middle portion being about ¼ inch thick, with edges of about ⅝ inch on each side to form the 1½ inch width 12.

In any event, it is preferred that an area surrounding the aperture 14 extend to at least the width 12 of one side of the component body 2. Most preferably, the component body 2 comprises a bump-out 22 on one side of the front 4 or back 6 which is to be adjacent the workpiece, to keep the remainder of the component body 2 spaced away from the workpiece and reduce risk of marking the finish (see FIG. 5).

It is also preferred that the area surrounding the side of the aperture 14 opposite the bump-out 22 be formed as a recess 24 from the width 12. The recess 24 is preferably sized not only to accept the head of the fastener but, in the most preferred embodiment, to provide a receptacle to retain and support a dowel. This permits the use of a dowel as a span between two components 2 with the recesses 24 facing one another, which can be fastened with a fastener passing from the bump-out 22 to the dowel in the recess 24, on which workpieces can be hung if desired.

The component body may be made of any suitable material that can provide structural integrity to the workpiece or stacked workpieces being supported, including wood, metal, plastic or the like, as well as combinations thereof. Most preferably, the component body is formed of an integrally formed plastic material by injection molding. Moreover, as described above, the middle of the component body 2, as well as areas through the component 2 and along the width 12, can be reduced and/or removed to further reduce the amount of material without reducing structural integrity.

Figure 6:
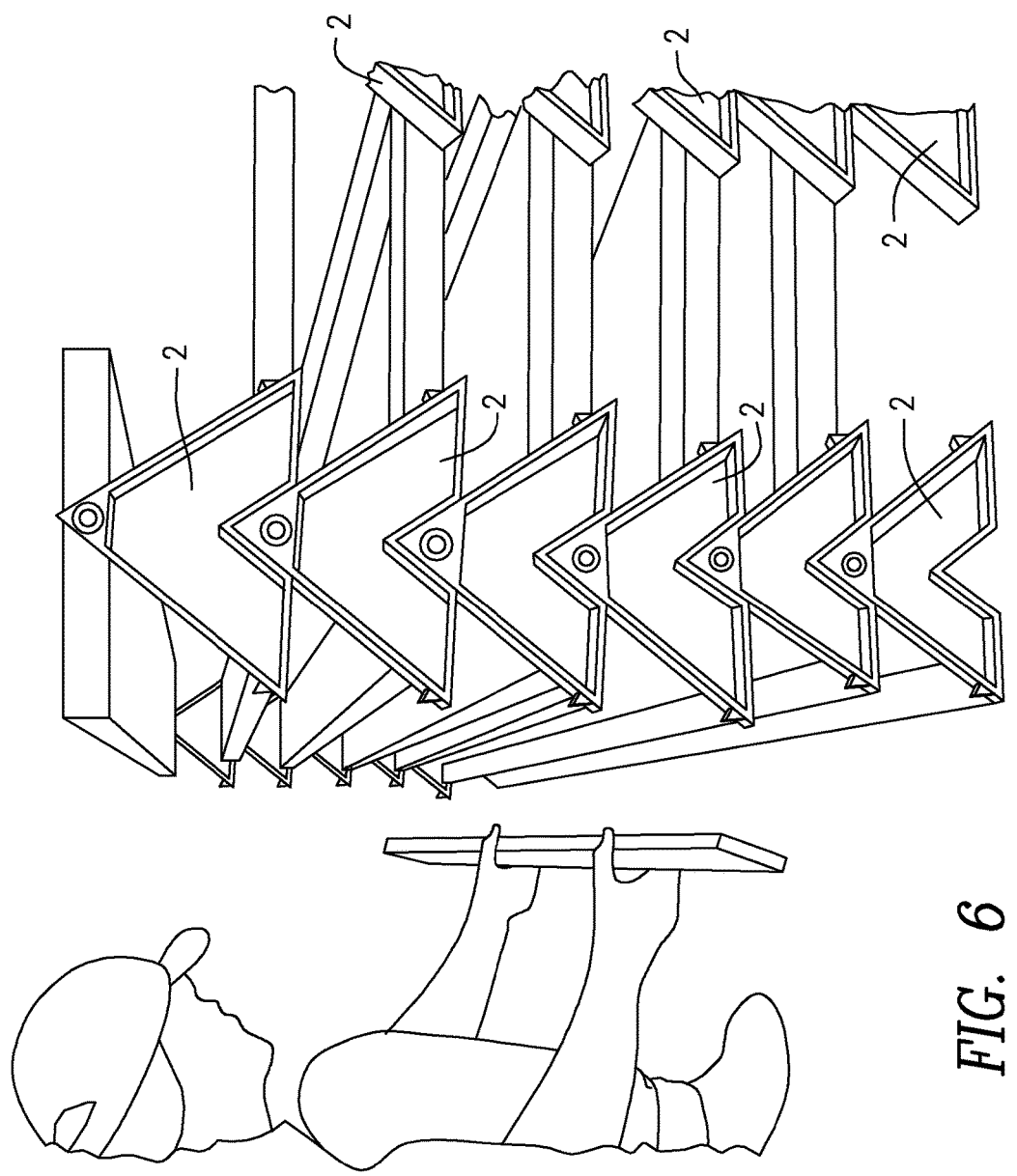
FIG. 6 is a perspective illustration of a rack system made of the rack components of the present invention holding a series of doors and trim or molding workpieces.

A rack system can be created using the rack component 2. As described above, the system may comprise four rack components 2 with a fastener for each component 2 to fasten the components to the top and bottom edges of a door. Using four more rack components 2 with fasteners for each additional door, a series of doors with rack components 2 fastened in substantially the same location can be stacked as shown in FIG. 6. Additionally, trim, moldings or the like can be placed on the supports 20 of the successive components 2, as further shown in FIG. 6.

Figure 7:
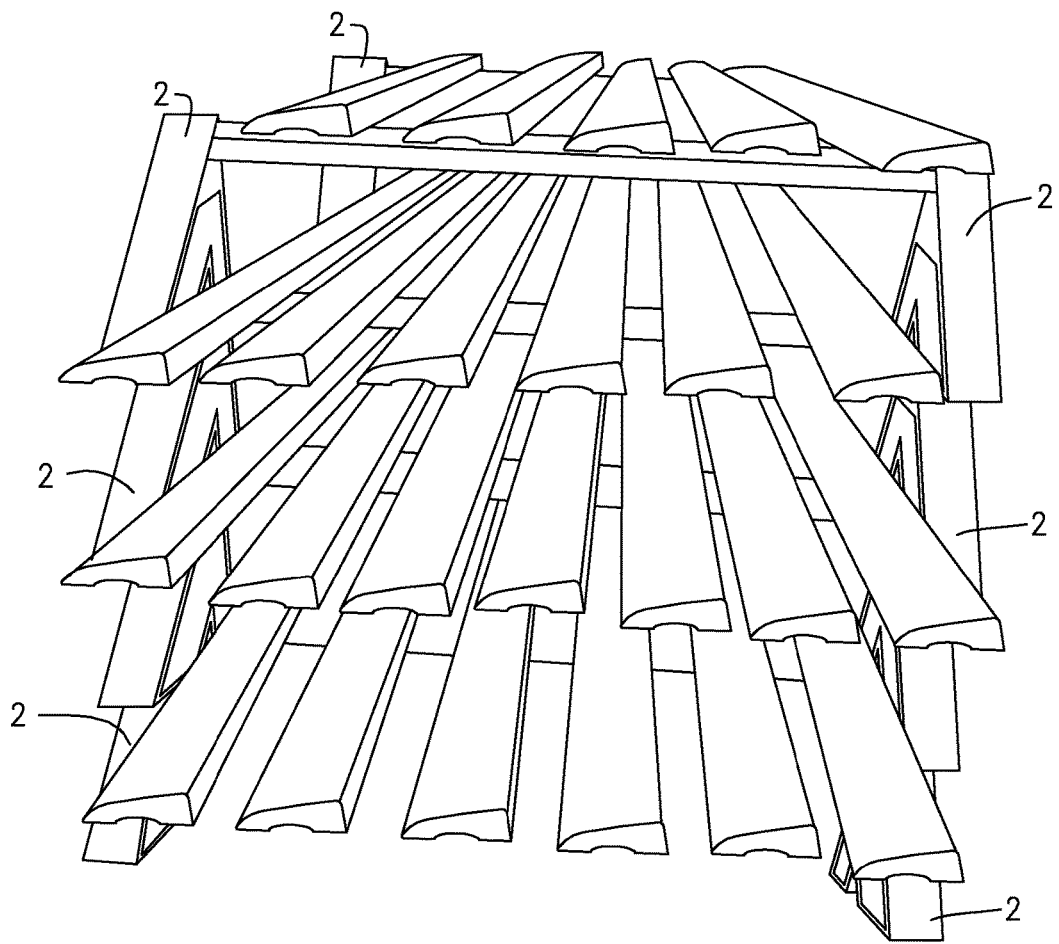
FIG. 7 is a perspective illustration of a rack system made of the rack components of the present invention with a span holding multiple trim or molding workpieces on a number of levels.

Similarly, fastening connecting spans between rack components 2 to form bridges, and using two or more bridges of two components 2 with a span fastened between them to a level, a series of levels can be formed to hold finished trim, moldings or the like on successive levels. As shown in FIG. 7, this system maximizes space for drying many pieces of trim, molding or the like in a minimum amount of space.

Figure 8:
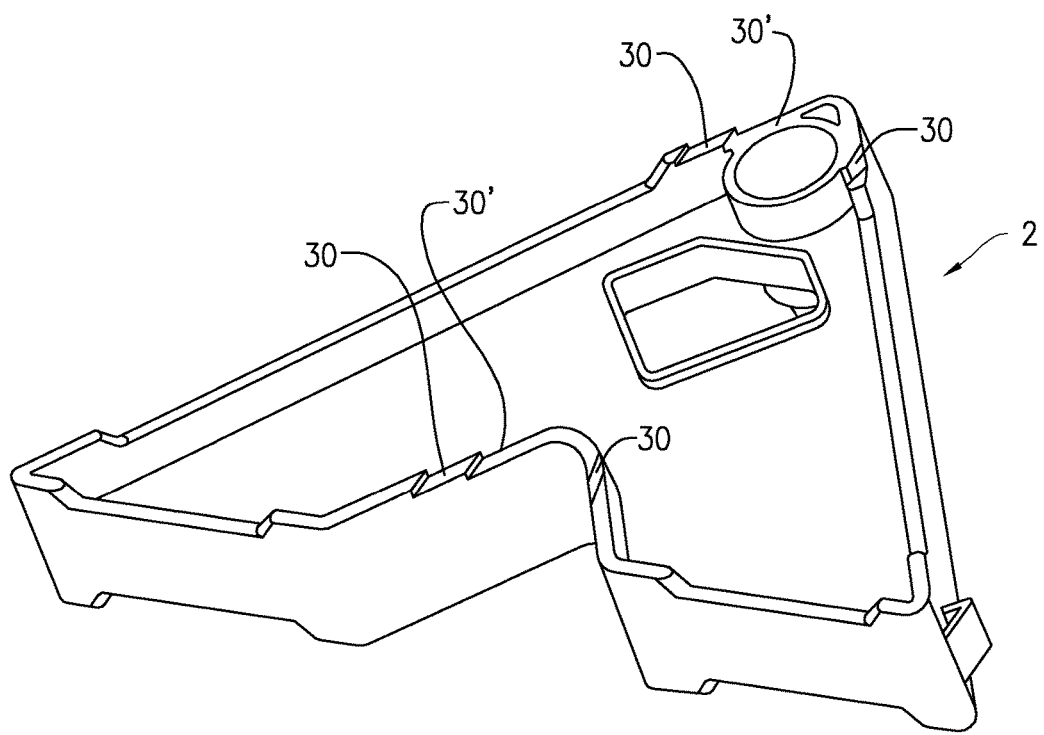
FIG. 8 is a front perspective view of an alternative embodiment of the rack component of the present invention with vertically oriented recessed areas.

The present invention can also be modified to include multiple indentations 30 on either the front 4 and/or the back 6 of the rack component 2. This alternative embodiment of the present invention is shown in FIG. 8. There are four indentations along the component body 2 of the rack. Two of these indentations, 30a and 30b, are located at the top 8 of component body 2. The remaining two indentations, 30d and 30c, are located below the center 19 of component body 2 just above the configuration cut-out 18.

Figure 9:
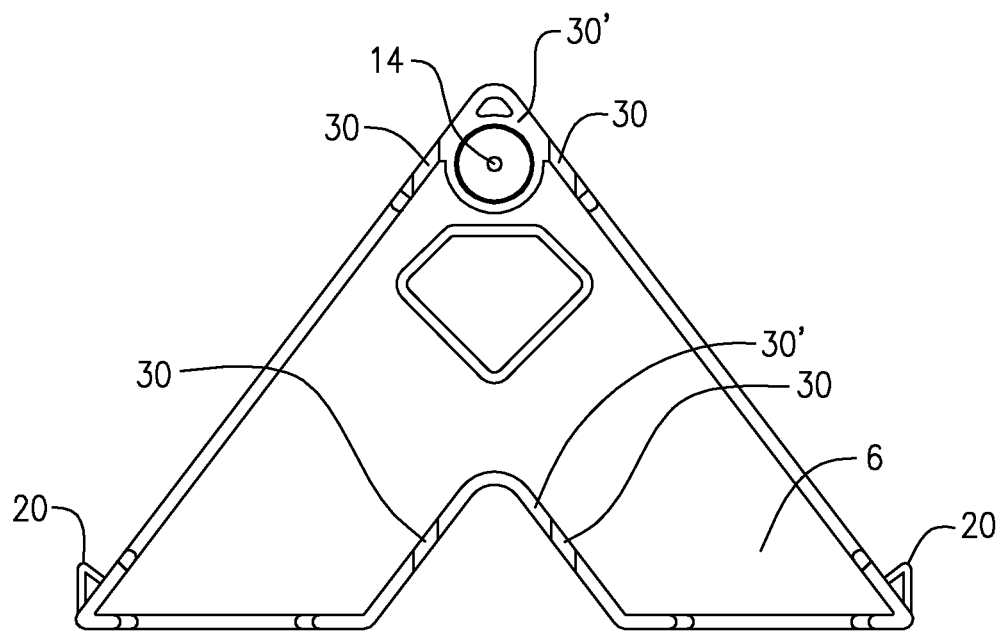
FIG. 9 is a front elevation of the embodiment of the rack component shown in FIG. 8.
Figure 10:
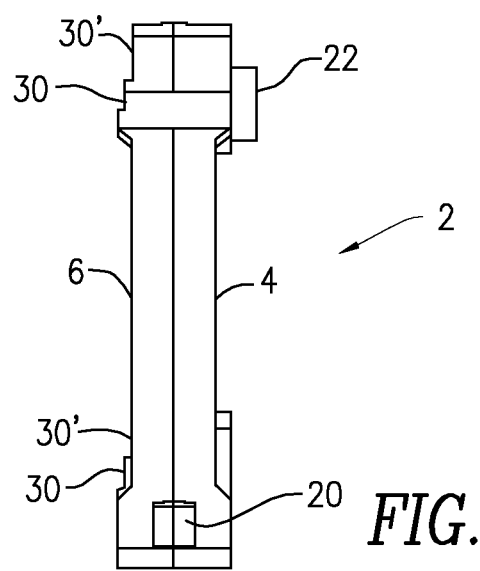
FIG. 10 is a side elevation of the embodiment of the rack component shown in FIG. 8.

FIGS. 8 to 10 illustrate an alternative preferred embodiment of the rack component 2 of the present invention. As shown in FIGS. 8 to 10, the front 4 of the rack component 2 includes vertically oriented recessed areas 30 for holding a workpiece such as a door in a vertical orientation. In the most preferred embodiment shown in FIGS. 8 to 10, the rack component 2 has two recessed areas 30 and 30' have varying widths centered on the front of the rack component 2. More specifically, the first recessed area 30 has a wider width for holding a standard exterior door and a second recessed area 30' having a narrower width for holding a standard interior door centered in the first recessed area 30.

Figure 11:
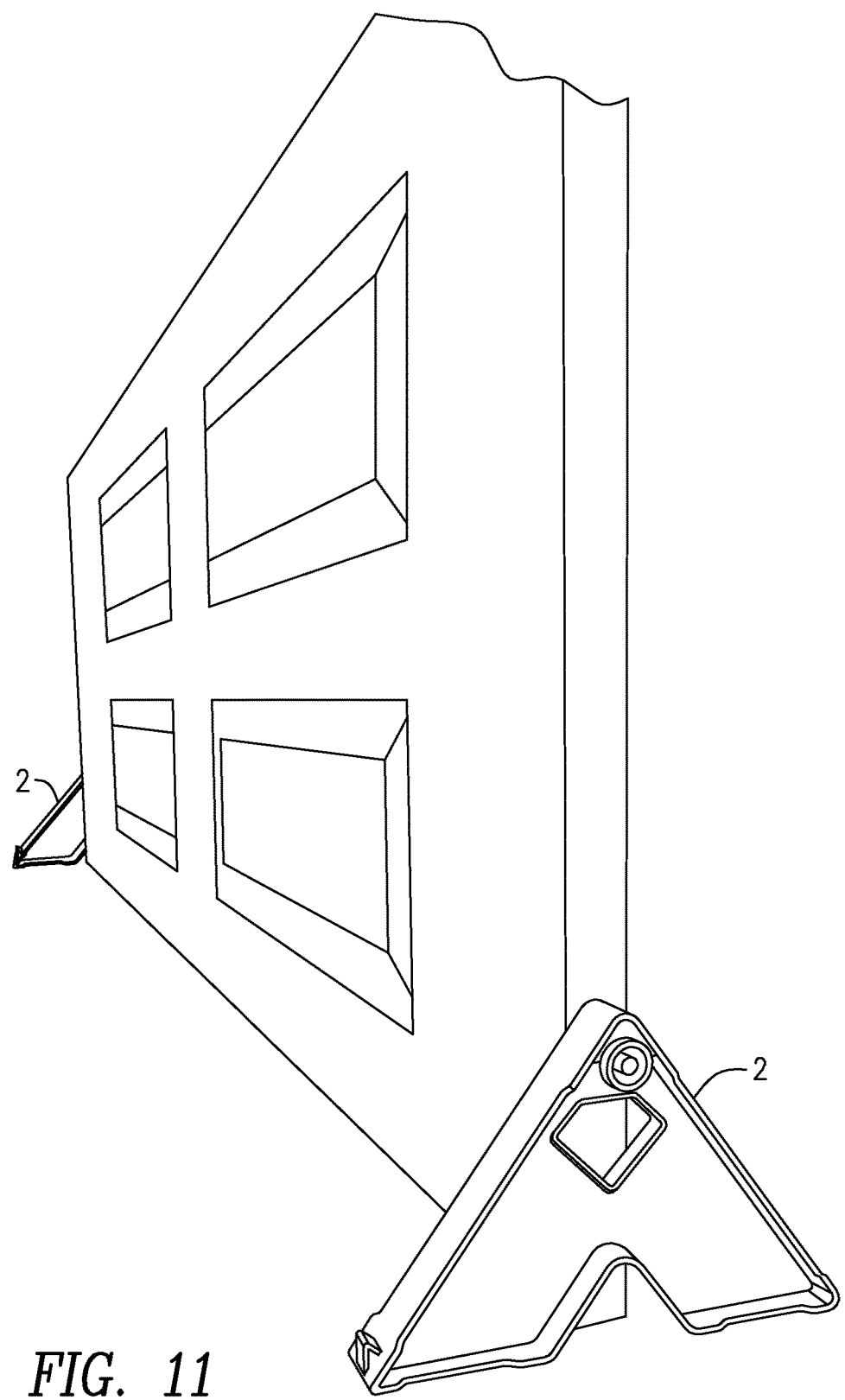
FIG. 11 is a perspective view of a door held in a vertical orientation using the rack component of FIG. 8.

FIG. 11 illustrates a system using the rack components 2 shown in FIGS. 8 to 10. Two rack components 2 are disposed against each end of the relevant workpiece placed in a vertical orientation, where the recessed areas 30 on the fronts 4 of the rack components 2 maintain the workpiece in the vertical orientation.

Referring to FIGS. 8 to 10, preferred recessed area 30 has a width of about 2¼ inches and a depth of about ⅛ inch, where the preferred recessed area 30' has a width of about 1¾ inches and a depth of an additional ⅛ inch. If desired, a third recessed area 30" may have a width of about 1⅜ inches and a further depth of ⅛ inch.

Although the depths of the recessed areas 30 are not critical, it is preferred that they be from about 1/16 inch to about 3/32 inch for each additional recessed area 30. It is most preferred that each recessed area 30 have respective depths of about 1/16 inch to about 1/8 inch.

Similarly, the width of each respective recessed area 30 is not critical and is determined based on standard workpiece widths. In this regard, it is understood that a U.S. standard exterior door is either 1¾ or 2¼ inches, where a U.S. standard interior door is either 1⅜ or 1¾ inches. For the purposes of stability, however, the width of each recessed area 30 should not be much more than or much less than the thickness of the applicable workpiece.

In a preferred embodiment, a system of two component bodies 2 having recessed areas 30 is used to stabilize a standard exterior door in a vertical position, as shown in FIG. 11.

FIGS. 12-16 illustrate an additional embodiment of the present invention. This embodiment provides additional functionality to the present invention, including the ability to flip and paint cabinet doors, trims, and mortises. To this end, a bracket 40 cooperates with the rack components 2 to allow a user to rotate a workpiece.

In a preferred embodiment, the bracket 40 has an "L-shaped" geometry comprising a lateral portion and a longitudinal portion. Two axial elements 42 are preferably disposed at opposite ends of the longitudinal portion of the bracket 40, extending orthogonal to the longitudinal portion and parallel to one another. The lateral portion of the bracket 40 includes an attachment member 46 for attaching a workpiece to the bracket 40. In a preferred embodiment, the attachment member 46 has an attachment surface that extends a distance from the lateral portion, so that the workpiece does not touch the lateral portion when mounted on the attachment member 46 (see FIG. 12).

The bracket 40 can be made of any suitable material known to those in the art, but is preferably made of a strong metal, such as steel and preferably stainless steel. Axial elements 42 can be any axial extension from the longitudinal portion of the bracket 40 for axial insertion into the apertures 14 in the rack components 2. In one embodiment, the axial elements 42 may be screws or bolts that are affixed to the bracket 40 by welding the heads of the screws or bolts to the longitudinal portion of the bracket 40, as is illustrated most clearly in FIG. 13. This could permit the user to attach a nut to the screws of the axial elements 46, thereby holding the bracket 40 on the rack components 2. However, smooth cylindrical extensions or other axial elements 42 and means of affixing said axial elements 42 to the bracket 40 may be used.

Figure 12:
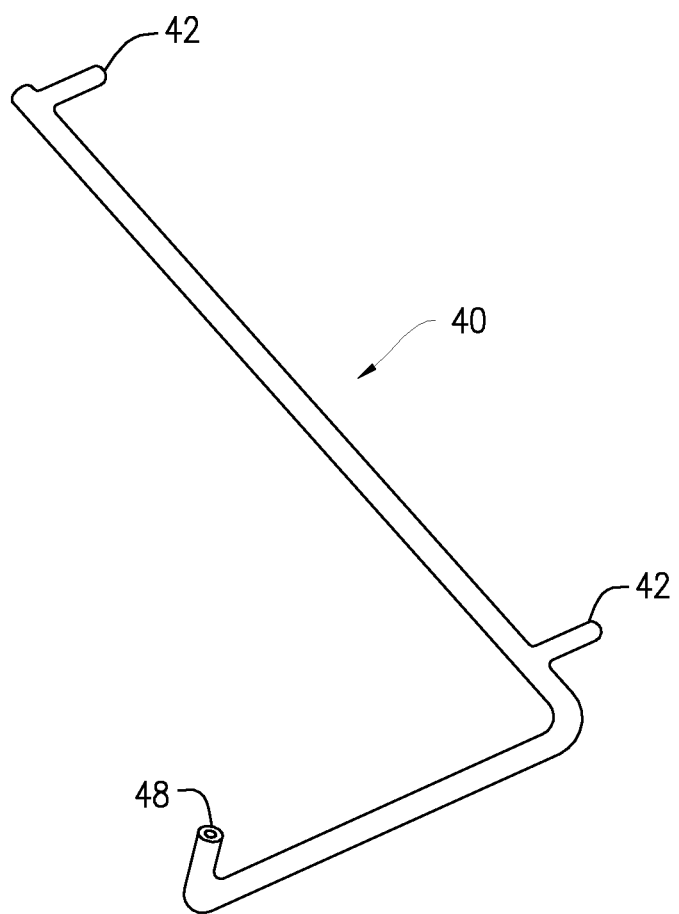
FIG. 12 is a perspective view of a bracket attached to the rack component to rotate a workpiece.
Figure 13:
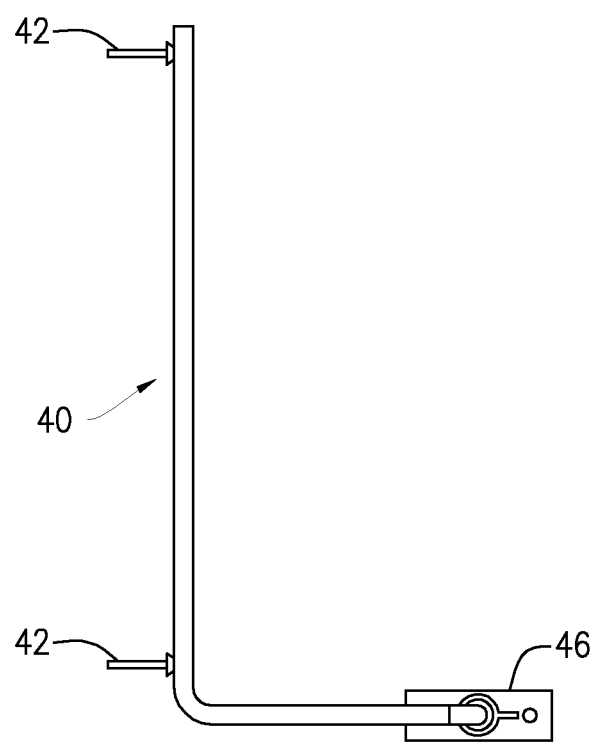
FIG. 13 is a front view of the bracket of FIG. 12 with exemplary attachments shown.

Turning to FIGS. 12-14B, the attachment member 46 is adapted to attach a workpiece to the bracket 40. In one embodiment, the attachment member 46 can have an aperture for fixedly receiving an orthogonal terminal end of the lateral portion of the bracket 40 as shown in FIG. 12, however, any means of fixing the attachment member 46 to the lateral portion of the bracket 40 can be used, such as bolting, welding, adhering, etc., as long as it can hold the workpiece during the work and rotation processes.

Figure 14A:
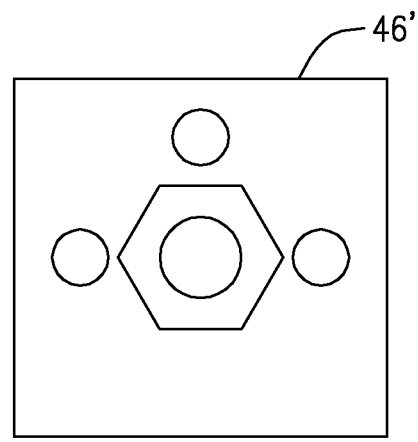
FIG. 14A is a front view of an embodiment of an attachment for the bracket shown in FIG. 12.
Figure 14B:
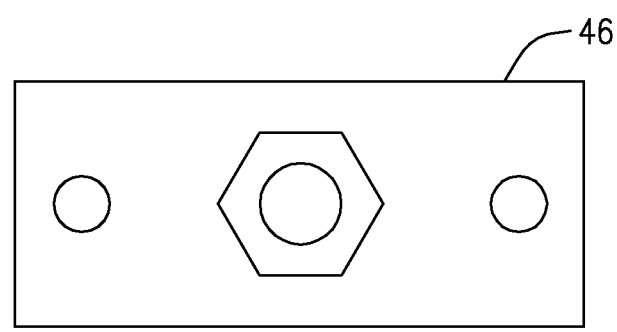
FIG. 14B is a front view of an alternative embodiment of an attachment for the bracket shown in FIG. 12.

The attachment member 46 can have any shape, such as a square 46' shown in FIG. 14A, a rectangle 46 shown in FIG. 14B, or any other suitable shape that permits attachment of the workpiece to the bracket 40. The attachment member 46 preferably comprises a plate with one or more holes for receiving one or more screws, to screw the workpiece onto the attachment member. For example, when the workpiece is a cabinet door, the attachment member 46 can be screwed onto the back of the cabinet door, i.e., on the corner where the metallic strike plate is often attached to the cabinet door for contacting a magnet on the cabinet to keep it closed.

Figure 15:
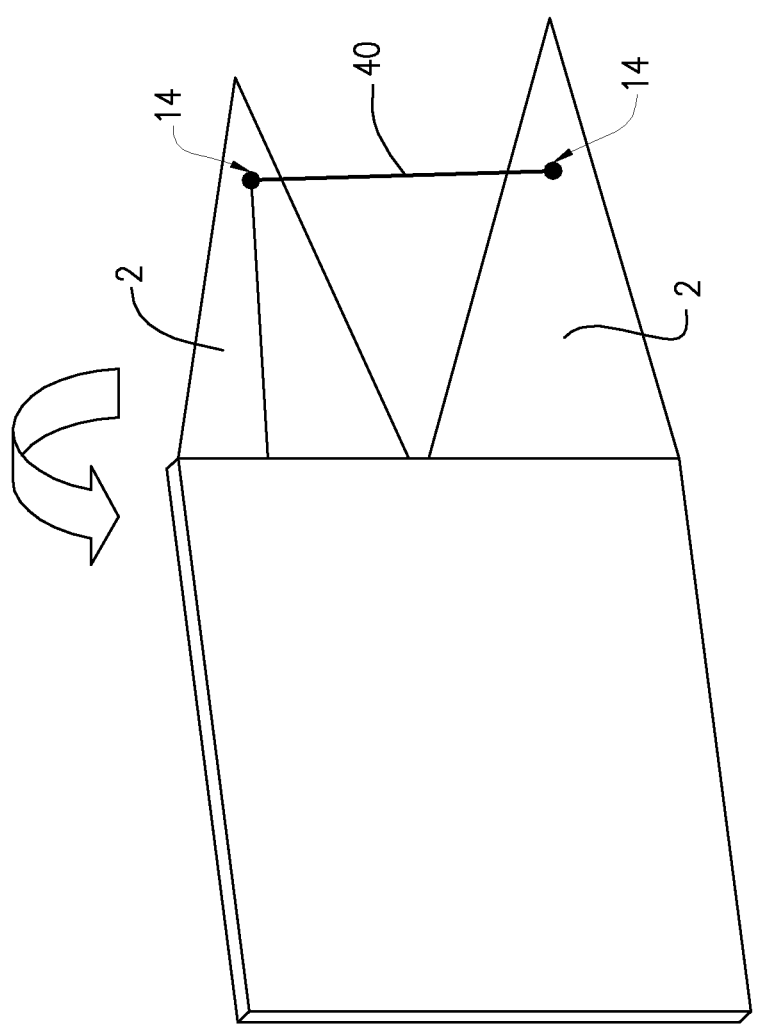
FIG. 15 is a top elevation of a rack system utilizing the rack components and the bracket of the present invention to rotate a workpiece.
Figure 16:
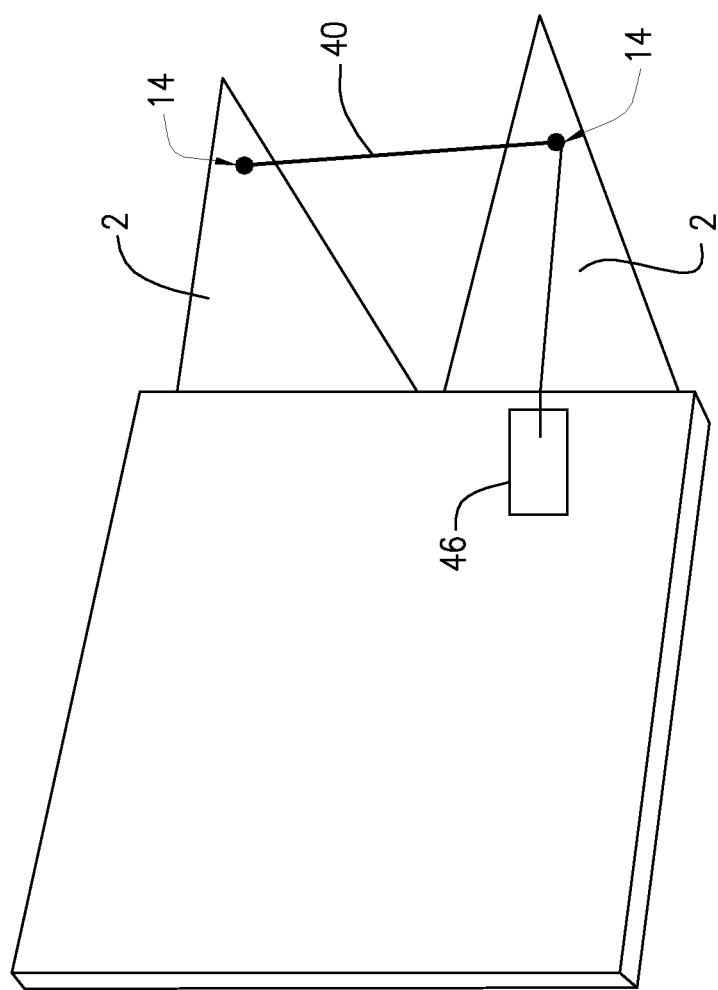
FIG. 16 is a view of the rack system of FIG. 15 depicting the arrangement of its components after the workpiece is rotated.

FIGS. 15 and 16 illustrate a system for rotating a workpiece using the bracket 40 and a pair of rack components 2. The attachment member 46 is affixed to the underside of a workpiece and the bracket 40 is connected to a pair of component bodies 2 by inserting axial elements 42 into the respective apertures 14 of the rack components 2. Due to the "L-shaped" geometry of bracket 40, a first rack component 2 will be disposed farther from the lateral portion of the bracket 40 than the second rack component 2, such that the bracket 40 on the rack components 2 will hold the workpiece horizontal, adjacent the rack components 2.

The present invention also encompasses a method for rotating a workpiece using the above system(s). Other means or rotating a workpiece using the system(s) of rack components can surely be envisioned, but the method of the present invention preferably comprises the following steps:

First, a user will affix the attachment member 46 of the bracket 40 to the underside of a workpiece.

Next, the user will insert the axial elements 42 into the apertures 14 of the respective rack components 2 to support the workpiece.

The user then defines the first component body 2, disposed furthest away from the lateral portion of the bracket 40, as a moment of axial rotation.

Finally, the user will treat the lateral portion of the bracket 40 as a lever, enabling the user to rotate the second component body 2, disposed closest to the lateral portion, in the axial direction. As shown by the "rotation symbol" in FIG. 15, the second component body 2 is rotated around and over the first component body 2 that serves as the moment of axial rotation. This causes the workpiece to rotate in the axial direction along with the second component body 2, disposed closest to the lateral portion, so that the attachment member 46 is ultimately disposed on the top-side of the workpiece.

Variations, modifications and alterations to the above detailed description will be apparent to those skilled in the art. For example, the weight element may be in the form of three weighted rods with three adjacent pockets just in from terminal edge of the fold over panel. All such variations, modifications and/or alternatives are intended to fall within the scope of the present invention, limited only by the claims. Any cited patents and/or publications are incorporated by reference.

We claim:

1. A rack system comprising:
    at least two component bodies, each component body having a front, a back, a top, a base, a width between the front and the back, and an aperture extending through the component body near the top, wherein the top of each component body comprises a configuration that is the negative of a configuration cut-out on the base of the component body, such that the configuration cut-out on the base of the component body can receive a configuration on the top of another adjacent component body oriented below the component body,
    a bracket comprising a longitudinal portion having two or more axial elements, each axial element adapted to be received in the aperture of a respective component body of the at least two component bodies, and a lateral portion comprising an attachment member, wherein the attachment member is adapted to be affixed to a workpiece, and a fastener adapted to affix the attachment member to a workpiece, to hold the workpiece on the bracket.

2. The rack system of claim 1 wherein each component body is in the shape of a triangle with first and second sides of substantially equal length converging upwardly to an upper angle and a third side of an equal or different length than the first and second sides forming the base,
where the configuration cut-out on the base substantially corresponds to the upper angle and the aperture is within the upper angle.

3. The rack system of claim 1 wherein the component body is formed of an I-beam cross-section.

4. The rack system of claim 1 wherein the component body further comprises a bump-out on at least one of the front and the back of the component body about the aperture.

5. The rack system of claim 1 wherein the component body further comprises a support for resting a workpiece.

6. The rack system of claim 2 wherein the component body is formed of an I-beam cross-section.

7. The rack system of claim 2 wherein the component body further comprises a bump-out on at least one of the front and the back about the aperture.

8. The rack system of claim 1 wherein the fastener comprises a screw.

9. The rack system of claim 1 wherein the component body is integrally formed of a single material.

10. The rack system of claim 9 wherein the component body is formed from a material taken from the group consisting of metal, wood and plastic.

11. The rack system of claim 1 wherein the longitudinal portion of the bracket and the lateral portion of the bracket forms a substantially "L-shaped" geometry.

12. The rack system of claim 1 wherein the axial elements extend orthogonally from the longitudinal portion and parallel to each other.

13. The rack system of claim 1 wherein the axial elements are disposed at opposite ends of the longitudinal portion.

14. The rack system of claim 1 wherein the axial elements are taken from the group consisting of smooth cylindrical extensions, screws and bolts.

15. The rack system of claim 1 wherein the bracket is comprised of metal.

16. The rack system of claim 1 wherein the attachment member is permanently affixed to the lateral portion of the bracket.

17. A rack system comprising:
a first rack component adjacent a second rack component, the first rack component comprising a first component body having a front, a back, a top, a base, a width between the front and the back and a first aperture extending through the first component body near the top, and the second rack component comprising a second component body having a front, a back, a top, a base, a width between the front and the back, and a second aperture extending through the second component body near the top, wherein the top of each component body comprises a configuration that can be received in a configuration cut-out on the base of the component body of a corresponding rack component,
a bracket having a longitudinal portion, including a first axial element adapted to be received in the first aperture of the first rack component body and a second axial element adapted to be received in the second aperture of the second rack component body, and a lateral portion comprising an attachment member for affixing the bracket to a workpiece, and
a fastener adapted to affix the attachment member to a workpiece, to hold the workpiece on the bracket.

18. The rack system of claim 17, wherein the longitudinal portion and lateral portion of the bracket form a substantially "L-shaped" geometry, wherein the first and second axial elements are disposed on opposite ends of the longitudinal portion.

19. The rack system of claim 17 wherein the attachment member on the lateral portion includes an attachment surface against which the workpiece is mounted, the attachment surface extending from the lateral portion of the bracket.

20. A method of rotating a workpiece using the rack system of claim 17, wherein the method comprises the following steps:
a. affixing the attachment member to the underside of a workpiece;
b. inserting the first axial element into the first aperture of the first component body and the second axial element into the second aperture of the second component body;
c. defining the first component body, disposed furthest away from the lateral portion of the bracket, as a moment of axial rotation;
d. using the lateral portion of the bracket as a lever; and
e. rotating the second component body, disposed closest to the lateral portion, in the axial direction, around and over the first component body, that serves as the moment of axial rotation, thereby rotating the workpiece in the axial direction along with the second component body so that the attachment member is ultimately on the top-side of the workpiece.

21. The rack system of claim 17 wherein the fastener comprises a screw.

* * * * *